Figure 1:
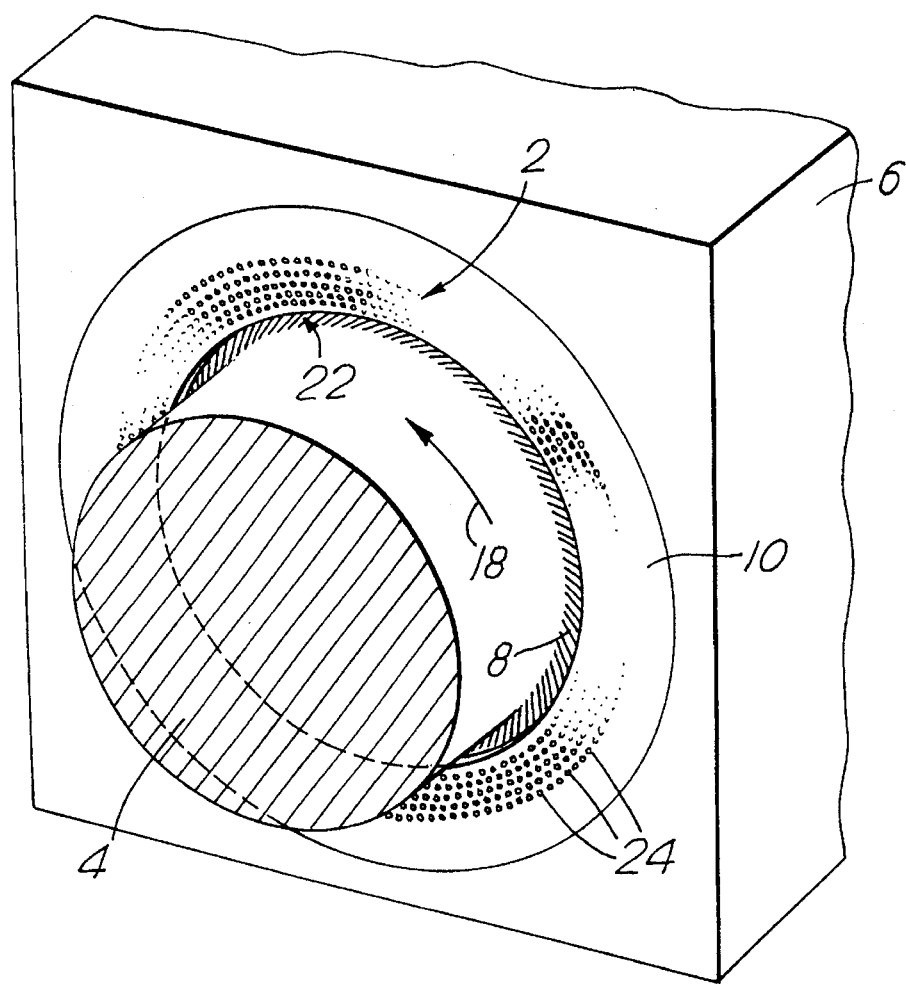

United States Patent [19]
Millener et al.

[11] Patent Number: 5,496,045
[45] Date of Patent: Mar. 5, 1996

[54] BRUSH SEAL WITH POROUS UPSTREAM SIDE-PLATE

[75] Inventors: Philip J. Millener; Timothy M. Edmunds, both of Bristol, England

[73] Assignee: Rolls-Royce PLC, London, England

[21] Appl. No.: 291,555

[22] Filed: Aug. 16, 1994

[30] Foreign Application Priority Data

Aug. 17, 1993 [GB] United Kingdom ............ 9317083

[51] Int. Cl.$^6$ .................................. F16J 15/447
[52] U.S. Cl. ................. 277/53; 415/173.5; 415/174.5
[58] Field of Search ....................... 277/23, 53, 54, 277/55, 56, 57; 415/173.5, 174.5

[56] References Cited

U.S. PATENT DOCUMENTS

| 4,060,250 | 11/1977 | Davis et al. | 277/53 |
| 4,277,072 | 7/1981 | Forch . | |
| 5,106,104 | 4/1992 | Atkinson et al. | 277/53 |
| 5,308,088 | 5/1994 | Atkinson et al. | 277/53 |
| 5,318,309 | 6/1994 | Tseng et al. | 277/53 |
| 5,401,036 | 3/1995 | Basu | 277/53 |

FOREIGN PATENT DOCUMENTS

| 1450553 | 9/1976 | United Kingdom . |
| 1598926 | 9/1981 | United Kingdom . |
| 2258277 | 2/1993 | United Kingdom . |

Primary Examiner—Scott W. Cummings
Attorney, Agent, or Firm—Oliff & Berridge

[57] ABSTRACT

In a brush seal adapted for use in disturbed fluid flow conditions the upstream side-plate is formed of porous material or has foraminate region. In conventional seals disturbed flow can generate a flow adjacent the face of the seal bristle pack which tends to lift bristles away from the second sealing element. Seal leakage is consequently increased. The foraminate or porous upstream side-plate reduces disturbing forces on the bristles by modifying flow patterns to avoid forces which lift the bristles.

9 Claims, 4 Drawing Sheets

BRUSH SEAL WITH POROUS UPSTREAM SIDE-PLATE

The invention relates to a brush seal. In particular, it concerns an improvement in the design of a brush seal to reduce leakage through a seal bounding a region of disturbed fluid flow.

Brush seals are employed to seal gaps between relatively movable components, especially rotating components as, for example in the internal air cooling system of a gas turbine engine, to prevent or at least substantially reduce leaking of cooling air. Excessive use of internal cooling air directly degrades engine efficiency and increases specific fuel consumption. The seals may be used as a gas or liquid seal, for example in an engine application it may be used as an oil or air seal.

There is known from our earlier UK Patent No. 1,450,553 a brush seal of this type comprising a mass of metallic bristles sandwiched between a pair of annular side-plates. The bristles are integrally joined with the side-plates and angled in the direction of relative rotation of the two sealing elements.

Our UK Patent No. 1,598,926 describes a brush seal provided with side-plates on the upstream and downstream sides of the bristles which extend for almost the full depth of the bristles. The bristles project a minimum length beyond the plates, with a circumferential component of direction, and make rubbing contact with a co-operating surface to provide a fluid seal. It is important that the bristles retain their flexibility so that they are able to track lateral shaft movement and maintain good sealing. Therefore the side-plates do not squeeze the bristles too tightly so that each bristle is free to bend but this also exposes bristles at the pack face to influence from disturbing flows. In this prior patent at least one of the side-plates is relieved on its bristle-contacting face over a sufficient distance from one edge to allow freedom for the bristles to move. In addition a gap is provided under the side-plates just equal to the clearance needed between the side-plates and the co-operating sealing surface, to take into account tolerances for manufacture, differential thermal expansion and permissible eccentricity of rotation.

Brush seals are designed for a controlled leakage flow through the bristle pack (amongst other reasons to cool the bristles) and this flow rate is determined by pressure differential, thickness of the bristle pack and number of bristles etc assuming that as a whole the bristles maintain seal contact. Thus, if a portion of the bristle pack loses seal contact the pressure differential acts across fewer bristles and the leakage rate increases. In seals having a cover plate or shield this leakage flow is fed from the high pressure side by fluid passing through the annular gap between the shield periphery and the rotating component. Likewise the leakage flow exits by passing through the annular gap between the periphery of the backing plate and the rotating component. Thus, it is imperative that this flow shall not cause avoidable disturbance of the bristles, for example by causing them to lose sealing contact. Once this happens, and the disturbing flow penetrates the bristle pack, the fewer the number of bristles in the pressure differential zone and the higher the leakage rate. The seal rapidly breaks down.

UK Patent Application No GB 2258277A approaches this problem by causing air to flow radially over the bristles to maintain them in optimum position and order.

According to this disclosure "The effect of the shield plate 10 is to substantially reduce disturbance of the bristles by protecting them from the turbulent flow 9". We have found in practice that a shield is effective against the primary turbulence but does not fully alleviate the problem. Flow drawn under the rim of the shield by the pressure differential in order to feed the seal leakage flow, which will retain some circumferential velocity component, can be just as disruptive. One of the embodiments described in this publication includes "Holes 15 periodically around the shield plate 10 (to) provide access for fluid to the radially outer end of the gap 14." Said gap 14 being a clearance between the face of the shield and the bristle pack "to ensure that the bristles are not clamped" which as such is foreshadowed by our UK Patent No 1598926 mentioned above. However, we have discovered in the provision of such "holes" in the shield further criteria must be complied with in order to provide an effective solution to this problem.

According to the present invention in its broadest form a side plate of a brush seal adapted to pacify the seal bristles bounding a region of disturbed fluid must have a substantial level of porosity.

According to one aspect of the invention there is provided a brush seal comprising a mass of bristles packed together in a layer between a pair of side-plates, the bristles being joined to the side-plates and have free ends for cooperating with a further member to form a seal thereagainst, the side-plates being handed for use between regions having a fluid pressure differential wherein one of the side-plates which, in use, faces the higher pressure region includes a foraminate region having a substantial level of porosity.

The side-plate containing the foraminate region may be spaced apart from the packed bristles.

Figure 2:
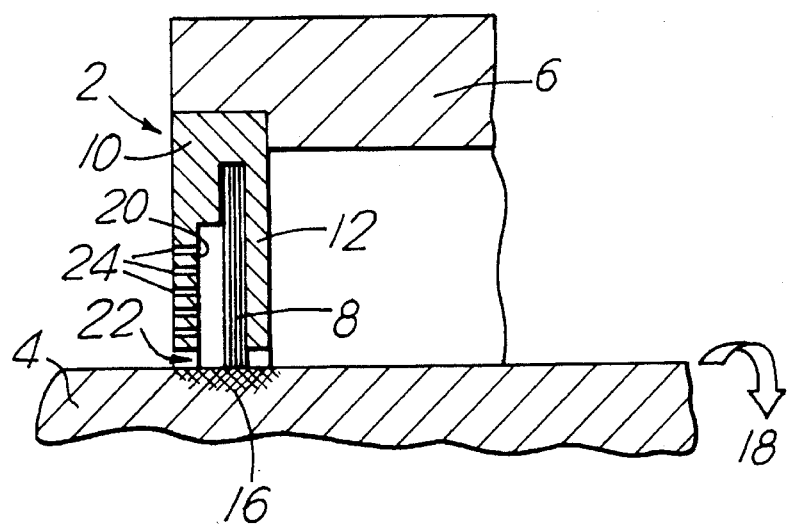
Figure 3:
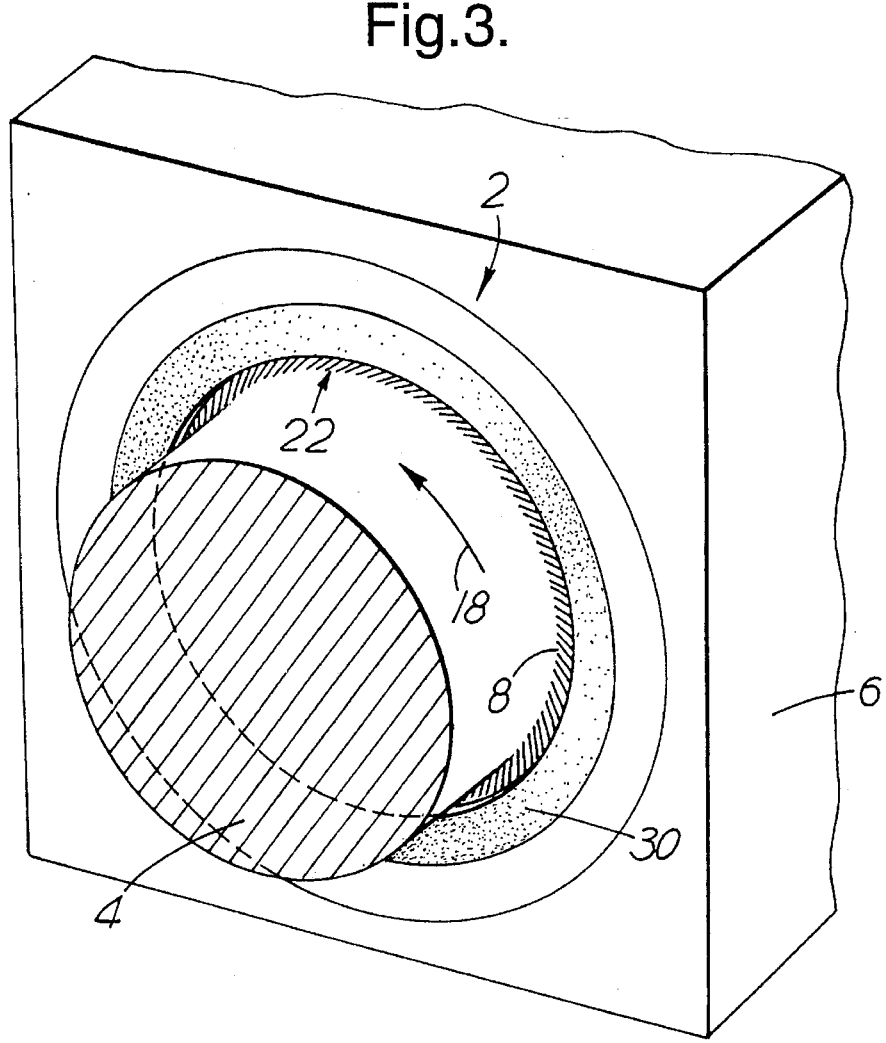
Figure 4:
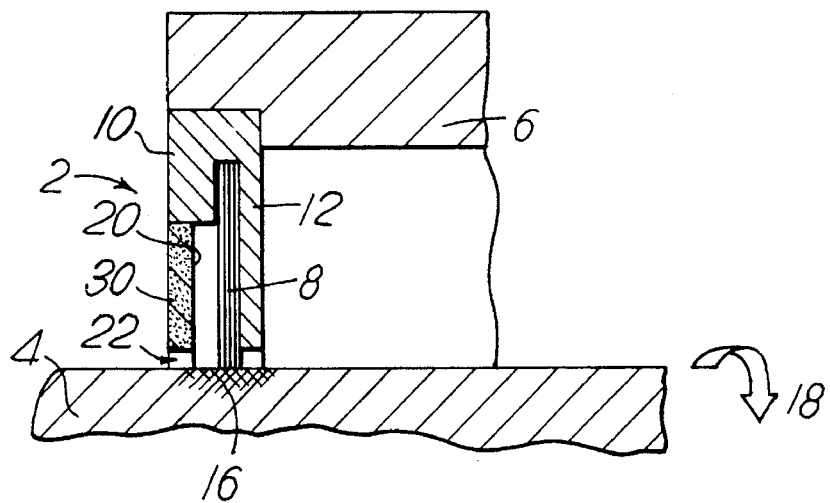
Figure 5:
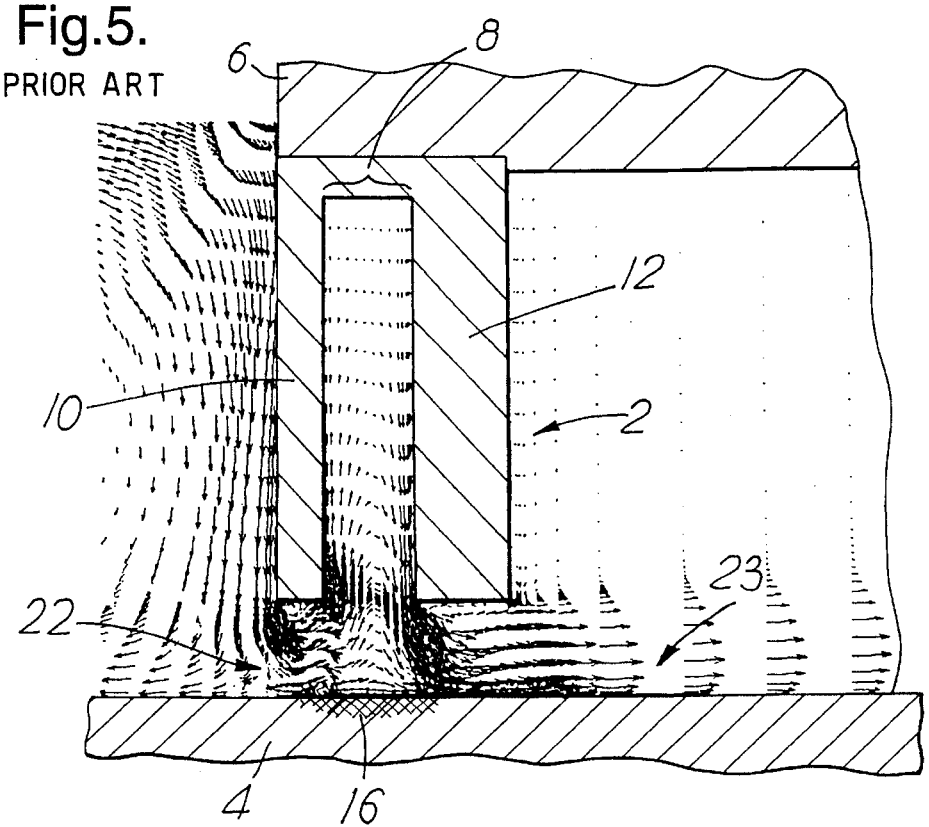
Figure 6:
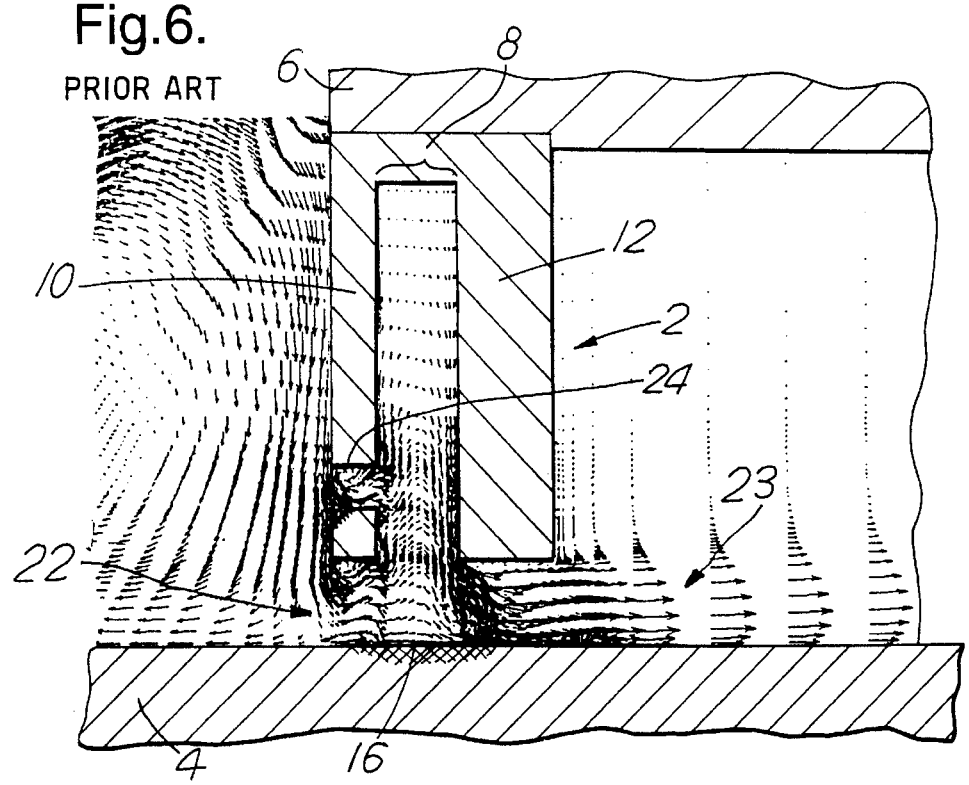
Figure 7:
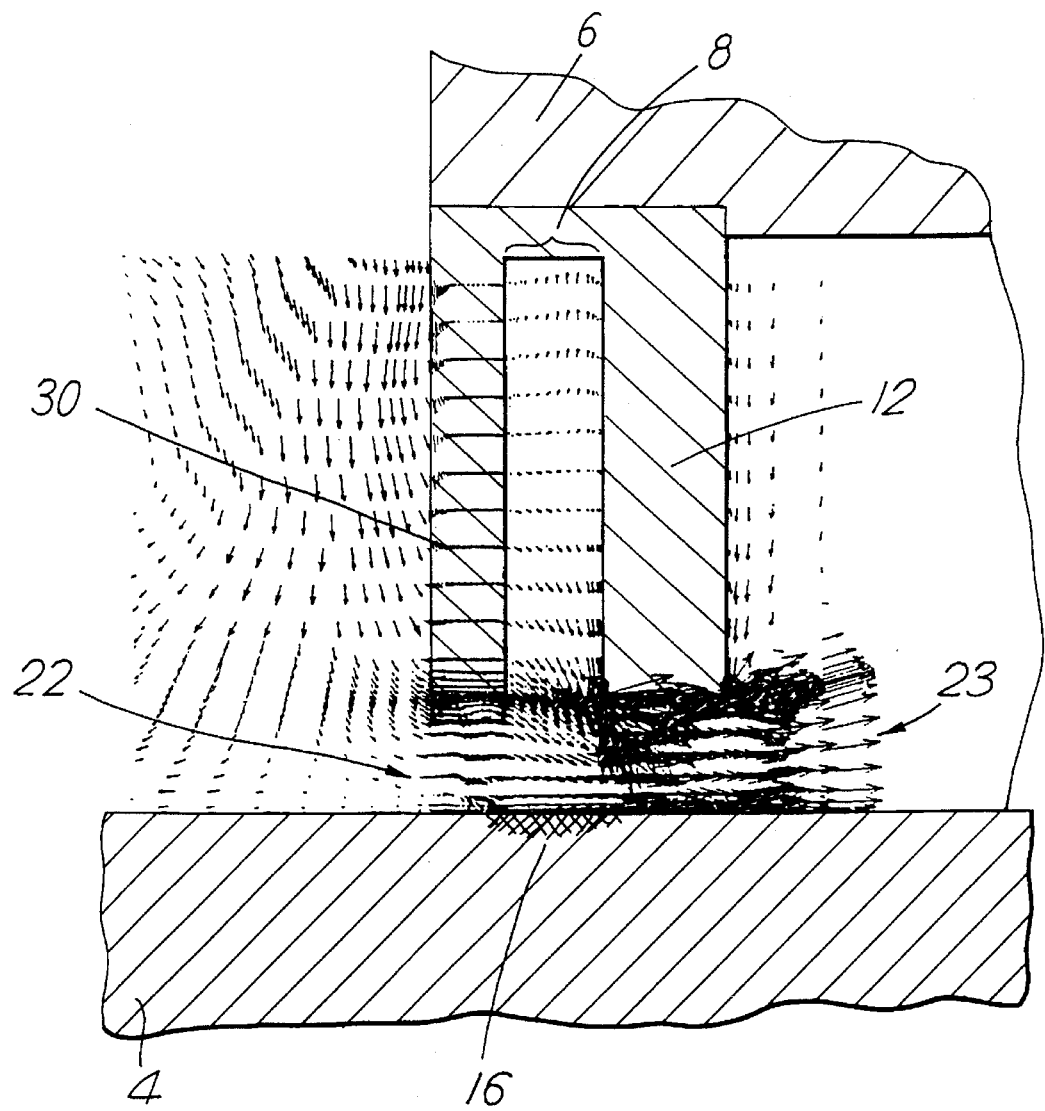

These and further features of the invention will be apparent in the following description of an example of an embodiment of the invention illustrated in the accompanying drawings, in which:

FIG. 1 shows a perspective view of a brush seal installation surrounding a drive shaft in which the seal cover-plate is pierced by a multiplicity of holes, FIG. 2 is a section through part of the seal of FIG. 1, FIG. 3 shows a view similar to FIG. 1 in which the seal cover-plate is formed of porous material, FIG. 4 is a section through part of the seal of FIG. 3, FIG. 5 shows a computer visualisation of a typical disturbed fluid flow pattern on the upstream side of a conventional brush seal having a solid cover-plate, FIG. 6 shows the local effect on flow within the seal of a hole through the cover-plate, and FIG. 7 shows the pacifying effect brought about by a porous upstream cover-plate.

FIG. 1 shows a general view of a typical installation of a brush seal, generally indicated at 2, surrounding a rotating shaft 4 to seal an aperture in a static structure 6 through which the shaft passes. FIG. 2 is a section through part of the seal 2 showing its component parts. The seal 2 comprises a first sealing element 8 consisting of a mass of bristles, preferably metallic, sandwiched between a pair of annular side-plates 10,12. The side-plate 12 on the downstream side acts as a backing plate to support the bristles 8 in the axial direction of leakage flow. The other side-plate 10 acts as a cover-plate intended to shield the bristles on the upstream side of the seal.

In the seal configuration being described the bristles are intended to seal against a radially inner co-operating surface on the shaft 4. The radially inward ends of the bristles project slightly beyond the inner circumference of backing plate 12 to run against a second, cooperating sealing element comprising a low-friction surface coating 16, for example, of ceramic material on shaft 4. The bristles 8 project beyond the backing-plate 12 with a circumferential component of direction in the same direction of rotation as shaft 4.

Normally the bristles 8 subtend an angle of approximately 45° to the surface of shaft 4.

The seal 2 is fitted such that the shield or cover-plate 10 is positioned on the upstream or higher-pressure side of the seal during operation. Thus, the pressure differential across the seal which drives leakage flow may be expected to generate axial forces which tend to urge the bristles 8 against the downstream backing-plate 12. In some seal designs the cover-plate may be relieved on its inward facing, bristle-contacting face 20 to enhance bristle flexibility. In other designs the cover-plate 10 may be formed with a reduced radial depth, thus the bristles are left open for the majority of the length. In both types of seal the bristles tend to behave in the same way in response to a pressure gradient, provided that is the fluid conditions on the upstream side of the seal are placid.

In disturbed fluid conditions where the fluid has significant radial or circumferential flow vectors at the bristle face, or where both exist, increased seal leakage has been observed and in some extreme cases bristle damage has been found. In such disturbed fluid conditions the forces which result form the radial and circumferential components of velocity tend to move the bristles away from the surface 16 on shaft 4 and away from the backing-plate 12. The effectiveness of the seal is thereby much reduced and the leakage rate increased accordingly.

FIG. 5 is a computer generated visualisation of a section through a seal having a solid cover-plate 10 in disturbed conditions showing radial and axial flow vectors. Each arrow represents a computed flow vector in which vector magnitude is represented by the length of the arrow and flow direction by the arrow direction. Leakage flow through the seal is represented by arrows indicated generally at 23 which reveal a jet of fast moving fluid emerging under the lip of backing plate 12 and travelling axially. The visualisation being two-dimensional only, shows only axial and radial velocities, circumferential velocities having been omitted for clarity. However it is to be assumed that a substantial circumferential component is present due to rotation of the shaft.

FIGS. 6 and 7 show the positions of the cover-plates 10, backing-plate 12, the shaft 4 and the static supporting structure 6 but not the bristles. However, the cover-plate 10 is a basic unrelieved cover-plate so there is no air gap between the rear of the plate and the bristle pack. TO the left of FIG. 5, ie on the upstream, higher-pressure side of the brush seal 2 disturbed flow is illustrated immediately adjacent cover-plate 10. This disturbed flow pattern has a strong radially inward flow across the upstream face of side-plate 10 and a very strong circumferential flow (not shown) into the plane of the page.

At the inner circumferential edge of the cover-plate 10 the flow divides with a proportion passing through the gap 22. This flow ultimately leaks through the bristle layer 8, under the downstream side-plate 12 and into the lower pressure region to the right of the drawing to constitute the leakage flow of the seal. It should be appreciated that the magnitude of the vector arrows do not necessarily correspond to mass flow. Present interest concerns the behaviour of the flow as it passes through gap 22 into the region behind the side-plate 10 including the space occupied by the bristles.

As is apparent from FIG. 5 the radially inward pointed flow vector is turned by the inner edge of cover-plate 10 to point radially outwards behind the cover-plate. The direction of the circumferential flow vector, on the other hand, remains relatively unchanged through gap 22. The resultant of these two flow vectors is a generally outward directed, distributed force along the length of the seal bristles tending to lift the bristles nearer cover-plate 10 away from the surface 16 of shaft 4. Therefore the effect of the radially outward flow across the upstream face of the bristle layer 8 is to lift the affected bristles clear of the second seal surface thereby destroying their sealing action. As the flow diffuses through the bristle layer 8 the radial flow vector turns clockwise, and the radial component of force on the bristles changes to radially inwards adjacent the inner face of backing side-plate 12. Bristles towards the downstream side of the bristle layer tend not to subject to as great lifting forces as those towards the upstream side. The pressure differential is experienced by fewer bristles in a thinner layer the seal leakage rate increases.

In accordance with the proposal of the invention a region of the side-plate 10 is provided with a foraminate region, at least towards its inner periphery. FIGS. 1 and 2 illustrate a seal in which a foraminate region is produced by a multiplicity of small holes 24 formed axially through cover-plate 10. Preferably the holes are spaced apart circumferentially around the side-plate on several pitch circles of different diameters and staggered as shown in FIG. 1. The preferred hole size has the hole diameter approximately equal to half the hole length. Hole spacing is selected to produce substantially even flow distribution behind the cover-plate and we have found it necessary to provide a shield 10 of substantial porosity in order to be effective. FIG. 2 shows a section through the seal of FIG. 1 on a radius bisecting the five concentric rings of holes.

We have found it necessary to provide a shield 10 having a porosity level of around 16% in order to achieve useful benefit, but very much higher levels up to about 40% porosity are useable. The embodiment of FIG. 1 consisted of a seal having a shield of about 0.33 m internal diameter. The porous characteristic was provided by drilling 5,200 holes in the shield, each of 0.0005 m (0.5 mm) diameter arranged in five concentric pitch circles with a hole spacing of 2 to 3 diameters. Related to the radial depth of the shield and therefore the seal bristle, this represented a porosity of 16%.

The porosity calculation is based on the surface area of the annulus of the shield which is in fluid flow contact with the bristle pack or the space immediately in front thereof. The hole measurements assume a straight sided hole with "square" edges at least on the entry side, that is on the side of the shield facing into the chamber on the high pressure side of the brush seal. This chamber, of course, also contains the turbulent fluid flow so that fluid flow impinging on the face of the perforated annular shield 10 has a substantial circumferential or swirl velocity. In these circumstances the efficiency, or $C_D$ factor, sharp-edged, straight sided holes is significantly reduced. For example, at typical flow rates the effective area of hole drawing smooth perpendicular flow is approximately 0.7×area of the hole, but we have found that in the turbulent flow conditions of a working seal this effective area may be further reduced to as little as ¼ of the cross-sectional area. Thus a relatively small number of holes achieving only porosity value may have a negligible effect in the high turbulence conditions generated in normal operations.

This would seem to indicate that a very high porosity would be desirable but this is not necessarily the case. Firstly, the shield must be effective to exclude flow turbulence from the bristle cavity, secondly the shield must retain sufficient pressure differential between its front and back faces to drive flow through the shield and thirdly the shield must retain sufficient integrity to obviate buckling and distortion during manufacture, assembly and use. We find that the maximum feasible figure is of the order of about 40% but prefer to strike a balance at the lower figure of about 16% to achieve the second and third of the above objections. In order to achieve the first objective we find that a multiplicity of small holes is preferable. Larger holes, slots and castellations are easier to manufacture but have the disadvantage of tending to introduce turbulent flow into the bristle chamber. We surmise this is because larger size apertures allow flow streams with significant circumferential velocity components to pass through the shield. A porous shield made of foamed metal (see below) appears to meet these criteria but is more difficult to make to a specified porosity and to assemble.

However, we have also found that porosity is not the only factor that has to be considered and spacing between the shield and the face of the bristle pack is also important. This axial spacing, we found, also strongly influences the radial velocity of the air across the bristle pack face at a given level of porosity. Basically, the radial velocity increases as the gap at a given level of porosity and for a fixed spacing the radial velocity falls as the porosity increases although ultimately turbulent conditions would be produced inside the shielded bristle chamber. Clearly a balance has to be achieved and, for the seal size example mentioned above, we have selected a gap of 0.0006 m (0.6 mm) at 16% porosity.

FIG. 6 shows a computer visualisation of the flow through a single hole and its effect on the local flow behind the cover-plate 10. The flow direction arrows indicate that in the region of the hole the axial flow from the hole interacts with the flow across the inner face of the cover-plate to substantially reduce the radial flow component. There is also a proportional effect (not shown) acting on the circumferential component of flow. The overall effect produced is to reduce lift on the bristles so that their free ends remain in contact with the surface of shaft 4 and thereby reduce seal leakage.

An alternative arrangement is illustrated in FIGS. 3 and 4 in which the cover-plate 10 is formed either entirely of porous material or with a porous inner, annular region. This porous material may comprise a foamed metal having an open-cell or honeycombed structure, Such as RETIMET (Regd Trade Mark). Material having a porosity of about 16% is found to produce useful results, but a useful porosity range of up to about 40% is contemplated.

Referring to FIG. 3 and 4, an annulus 30 of porous material is joined, for example by welding, to a modified cover-plate 10 of reduced radial depth. Alternatively the whole of the cover-plate 10 may be constructed of porous material- The result achieved by use of the porous cover-plate is illustrated in FIG. 7. The pressure differential between the front and rear faces of the cover-plate produces an evenly-distributed, substantially axial flow through cover-plate 10. As in the preceding example there is a circumferential flow vector not shown in the drawing. The distributed axial flow interacts to modify fluid flow across the rear of the cover-plate to produce a flow within the bristle layer 8 which has a radially inward direction. Thus taking into consideration the circumferential flow the overall flow tends to be parallel to and towards the free ends of the bristles. The resulting force on the bristles is either in a direction which does not tend to lift the bristles away form the surface of shaft 4 or is insufficient to overcome the inherent stiffness of the bristles. Consequently the pressure difference across the brush seal is borne by the whole layer and the leakage rate remains at or close to its design figure.

Although the invention has been described with reference to annular brush seals in which the bristles extended inwardly it is to be understood that the invention may be applied to other forms of brush seal.

We claim:

1. A brush seal for sealing a leakage gap between a rotating member and a relatively stationary member, said gap extending between an upstream, high pressure region and a downstream, low pressure region, the brush seal comprising:

a mass of bristles packed together in an annular layer between upstream and downstream side-plates, the downstream side-plate being spaced from the rotating member to form a seal gap, the bristles being disposed against the upstream face of said downstream side-plate and laying with a radial component, the bristles having free ends which extend towards a surface of the rotating member to form a seal thereagainst, the upstream side-plate is disposed with its downstream face adjacent the upstream side of the layer and said upstream side-plate includes a foraminate region having a uniformly distributed porous region with a porosity within a range of about 16% to about 40%.

2. A brush seal as claimed in claim 1 wherein the foraminate region of the upstream side-plate occupies at least a region towards the free ends of the bristles.

3. A brush seal as claimed in claim 1 wherein the side-plates are spaced apart by the thickness of the mass of bristles.

4. A brush seal as claimed in claim 1 wherein at least the foraminate region of the upstream side-plate is spaced apart from an adjacent face of the mass of bristles.

5. A brush seal as claimed in claim 1 wherein the upstream side-plate comprises a solid member pierced by a multiplicity of holes.

6. A brush seal as claimed in claim 5 wherein upstream side-plate comprises an annular member and the multiplicity of holes are formed therein in a concentric array.

7. A brush seal as claimed in claim 6 wherein the array of holes are distributed around a plurality of concentric pitch circles.

8. A brush seal as claimed in claim 1 wherein at least the foraminate region of the upstream side-plate is formed of porous material.

9. A brush seal as claimed in claim 8 wherein said porous material consists of a honeycombed metal.

* * * * *